United States Patent [19]

Iwasawa et al.

[11] 4,355,268
[45] Oct. 19, 1982

[54] MOTOR CONTROL APPARATUS

[75] Inventors: Teruo Iwasawa, Mitaka; Hitomi Tojiki, Hachioji, both of Japan

[73] Assignee: Olympus Optical Co., Ltd., Tokyo, Japan

[21] Appl. No.: 220,364

[22] Filed: Dec. 29, 1980

[30] Foreign Application Priority Data

Feb. 20, 1980 [JP] Japan ................................. 55-20050

[51] Int. Cl.³ .............................................. H02P 5/16
[52] U.S. Cl. ................................... 318/314; 318/318; 318/327
[58] Field of Search ............... 318/314, 318, 327, 341, 318/326

[56] References Cited

U.S. PATENT DOCUMENTS

| | | | |
|---|---|---|---|
| 4,149,117 | 4/1979 | Weber | 318/318 X |
| 4,211,964 | 7/1980 | Yabu et al. | 318/318 X |
| 4,218,641 | 8/1980 | Arnold et al. | 318/341 |
| 4,301,395 | 11/1981 | Furuhata et al. | 318/318 X |

FOREIGN PATENT DOCUMENTS 55-56486 4/1980 Japan ................................. 318/326

Primary Examiner—J. V. Truhe
Assistant Examiner—W. E. Duncanson, Jr.
Attorney, Agent, or Firm—Frishauf, Holt, Goodman and Woodward

[57] ABSTRACT

Disclosed is a motor control apparatus which includes a pulse generator for producing a first signal as a pulse signal having a period corresponding to the rotational speed of a motor, a timer for producing a second signal inverted to a first level in response to the first signal and subsequently inverted to a second level after the lapse of a predetermined period of time, a phase compensator for producing a third signal obtained through a phase advance type phase compensation for the second signal, a voltage/current converter for supplying and receiving a first current signal and a second current signal in accordance with the level of the third signal, an integrator for producing an output signal obtained through the integration of the first and second current signals, and a buffer for driving the motor in accordance with the level of the output signal.

8 Claims, 12 Drawing Figures

MOTOR CONTROL APPARATUS

BACKGROUND OF THE INVENTION

This invention relates to motor control apparatus for controlling motor rotation and, more particularly, to a motor control apparatus for maintaining a constant rotational speed of a DC servo-motor.

A motor, with which a constant rotational speed being unsusceptible to changes of the load and other external disturbances can be steadily obtained, is desired for driving the capstan of a tape recorder or the like. While various types of motors have hitherto been developed to meet this requirement, DC servo-motors which can be operated with low voltage and with which the rate of speed change with changing load is low, are suited for use with small-size tape recorders of battery powered type such as microcassette taper recorders. Japanese Patent Publication No. 32126/79 discloses a motor control circuit for such a DC servo-motor.

FIG. 1 is a block diagram which is a combination of FIGS. 4 and 6 in the afore-mentioned publication. Here, by assuming $$K_2 = 1 \quad (1)$$

and $$\delta_1 = \frac{C3 + C4}{C3} = 1 + \frac{C4}{C3} \quad (2)$$

equation (15) shown in the said publication, i.e., the transfer function $H_1(S)$ of the circuit from point A to point H in FIG. 1, can be expressed as $$H_1(S) = \frac{1 + SC4R8}{S(C4 + C3 + SC4C3R8)} \quad (3)$$

$$= \frac{1 + SC4R8}{C3S\{(C4 + C3)/C3 + SC4R8\}}$$

$$= \frac{1}{\delta_1} \cdot \frac{1}{C3} \cdot \frac{1 + SC4R8}{S\{1 + S(C4R8/\delta_1)\}}$$

In equation (3), the constant factor independent of the complex number parameter S, i.e., the gain G1, is $$G1 = \frac{1}{\delta_1 C3} \quad (4)$$

From equation (2), equation (4) can be modified as $$G1 = \frac{1}{\delta_1 C3} = \frac{1}{C3 + C4} \quad (5)$$

Equation (5) indicates that in the prior-art motor control circuit shown in FIG. 1 the gain G1 depends upon the capacitances C3 and C4.

In the actual circuitry, capacitors of the order of μF are often used for the capacitors C3 and C4. This provides difficulty in integrating the circuitry of FIG. 1 into a bipolar IC. For this reason, the capacitors C3 and C4 have to be provided as external component parts of the IC. These capacitors C3 and C4 having the capacitances of the order of μF may be fabricated as film capacitors or chemical capacitors. The former capacitors are large in size and expensive. The latter capacitors are far superior to the former capacitors insofar as their size and cost are concerned. However, the capacitance fluctuation or variation of chemical capacitors is considerable, and therefore their use is prone to provide considerable fluctuation of the aforementioned gain G1. In other words, the use of chemical capacitors causes the number of adjustment steps in the mass-production of a tape recorder to increase and also causes the quality or performance of the product to deteriorate (particularly characteristics of the speed accuracy and the wow/flutter are liable to deteriorate). From the above grounds, it is a conclusion that a motor control apparatus which is small in size and inexpensive and features little fluctuations of characteristics can hardly be obtained through the IC fabrication of the circuitry shown in FIG. 1.

The motor control circuit disclosed in the Japanese Patent Publication No. 32126/79 mentioned above has a further drawback. This lies in the lower limit of the working source voltage range. FIG. 2 corresponds to FIG. 8 in the publication. In this circuitry, supposing that transistors Q4 and Q7 and a constant current source IS are constituted by ordinary silicon bipolar transistors. The base-emitter threshold voltage $V_{EB}$ of a silicon transistor at room temperature is about 0.6 V. Also, supposing that the constant current source IS has the same circuit configuration as a transistor Q10 as shown, the supply voltage $V_{IS}$ for the source IS will require about 0.5 V or more. This is because, if the voltage $V_{IS}$ becomes lower than 0.5 V, the collector output impedance of the transistor constituting the source IS is greatly reduced so that the constant current characteristic can no longer be obtained. This is obvious from the collector current versus collector voltage characteristics of the conventional silicon transistor taking the base current as a parameter. From the above grounds, where $V_{EB} = 0.6$ V and $V_{IS} = 0.5$ V, the supply voltage Vcc to a controlled constant current source 109 has to be at least 1.7 V. It seems, in conclusion, that for ensuring the steady and stable circuit operation, the power supply voltage supplied to the motor control circuit shown in FIGS. 1 and 2 at room temperature has to be about 2 V or more.

SUMMARY OF THE INVENTION

The invention is intended in the light of the above circumstances, and its object is to provide a motor control apparatus, with which the constant factor of the transfer function of a servo-system being independent of the complex number parameter is hardly affected by the reactance component of a phase compensation means. Another object of the invention is to provide a motor control apparatus which is suitable for low voltage operation.

To achieve the above object, the motor control apparatus according to the present invention comprises first means for producing a first signal having a period corresponding to the rotational speed of the motor, second means for producing a second signal inverted to a first level in response to the first signal and subsequently inverted to a second level after the lapse of a predetermined period of time, third means for producing a third signal obtained through a phase advanced type phase compensation for the second signal, fourth means for supplying and receiving a first current signal and a second current signal in accordance with the level of the third signal, fifth means for producing an output signal obtained through the integration of the first and second current signals, and sixth means for driving the motor in accordance with the level of the output signal.

Where the third means in the motor control apparatus of the above construction includes a first compensation resistor provided at a point to which the second signal is applied and a point from which the third signal is derived, a capacitor connected in parallel with the first compensation resistor, and a second compensation resistor provided between the third signal supply end of the first compensation resistor and a fixed reference potential circuit for signal frequencies (a circuit at zero AC potential level), pronounced effects of achieving the first half of the above object can be obtained. More particularly, with this construction of the third means the constant factor δ in the transfer function of the servo-system can be determined only by the ratio between the first and second phase compensation resistors, and in this case the reactance component that has a bearing upon the gain of the servo-loop is constituted solely by the integrating element in the fifth means mentioned above. When resistors are integrated in an IC chip, the relative resistance ratio of these resistors are subject to less fluctuations. Thus, in the IC fabrication of a motor control apparatus according to the invention, it is possible to reduce the flunctuations of the transfer function in the servo-system. Also, except for the motor only the afore-mentioned integrating element (which is usually a capacitor of the order of μF) is an external large-size component of the IC, and this is advantageous from the standpoints of the size, cost and reliability.

Where the afore-mentioned fourth means in the motor control apparatus includes an emitter grounded type complementary inverter having PNP and NPN transistors, a first resistor connected in series with the emitter of the PNP transistor and a second resistor connected in series with the emitter of the NPN transistor, or the fourth means includes a C-MOS inverter having P-channel and N-channel transistors, pronounced effects of achieving the second half of the above object can be obtained. More particularly, with this construction of the fourth means it is possible to obtain a motor control apparatus, which is operable with a single dry battery with an electromotive force of around 1.5 V. This is very advantageous from the standpoint of reducing the size of, for instance, a portable microcassette tape recorder where the space factor of the drive source battery is important.

DETAILED DESCRIPTION OF THE PREFERRED EMBODIMENTS

Figure 1:
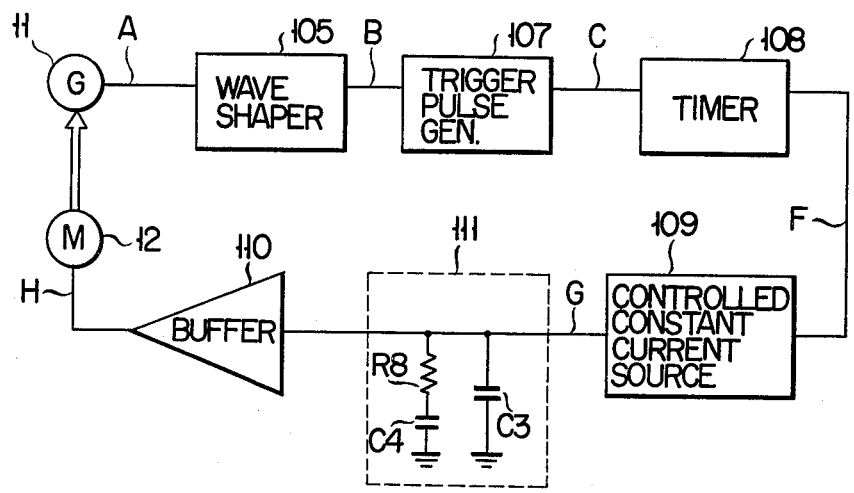
FIGS. 1 and 2 show a circuit construction of the prior art.
Figure 2:
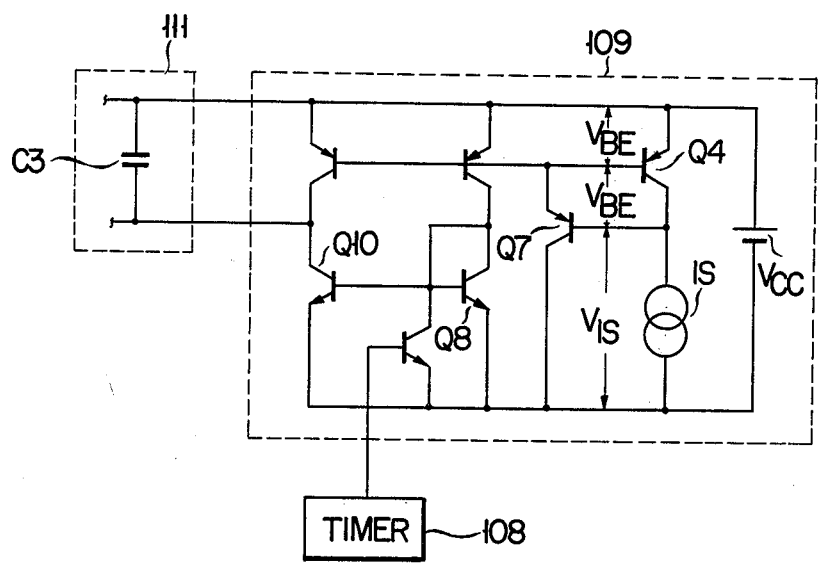

In the drawings, like parts are designated by like reference numerals to simplify the description.

Figure 3:
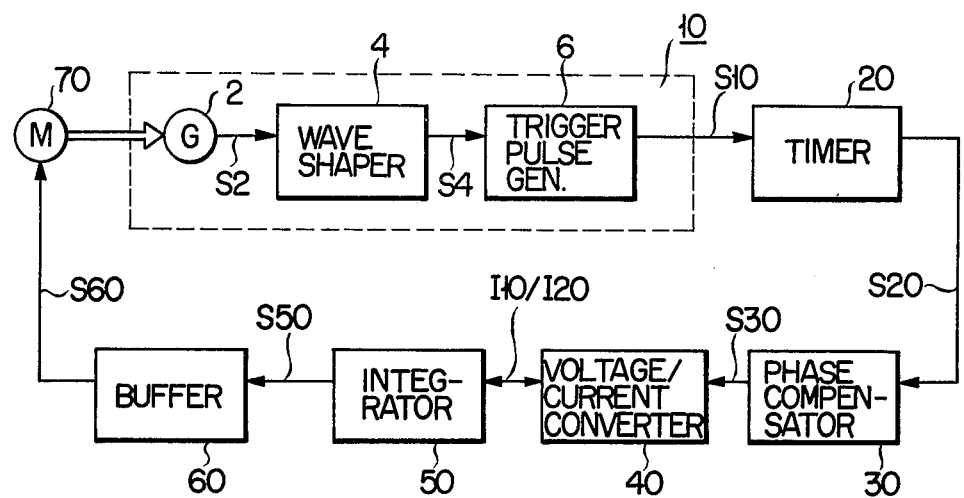
FIG. 3 is a block diagram showing an embodiment of the invention.
Figure 4:
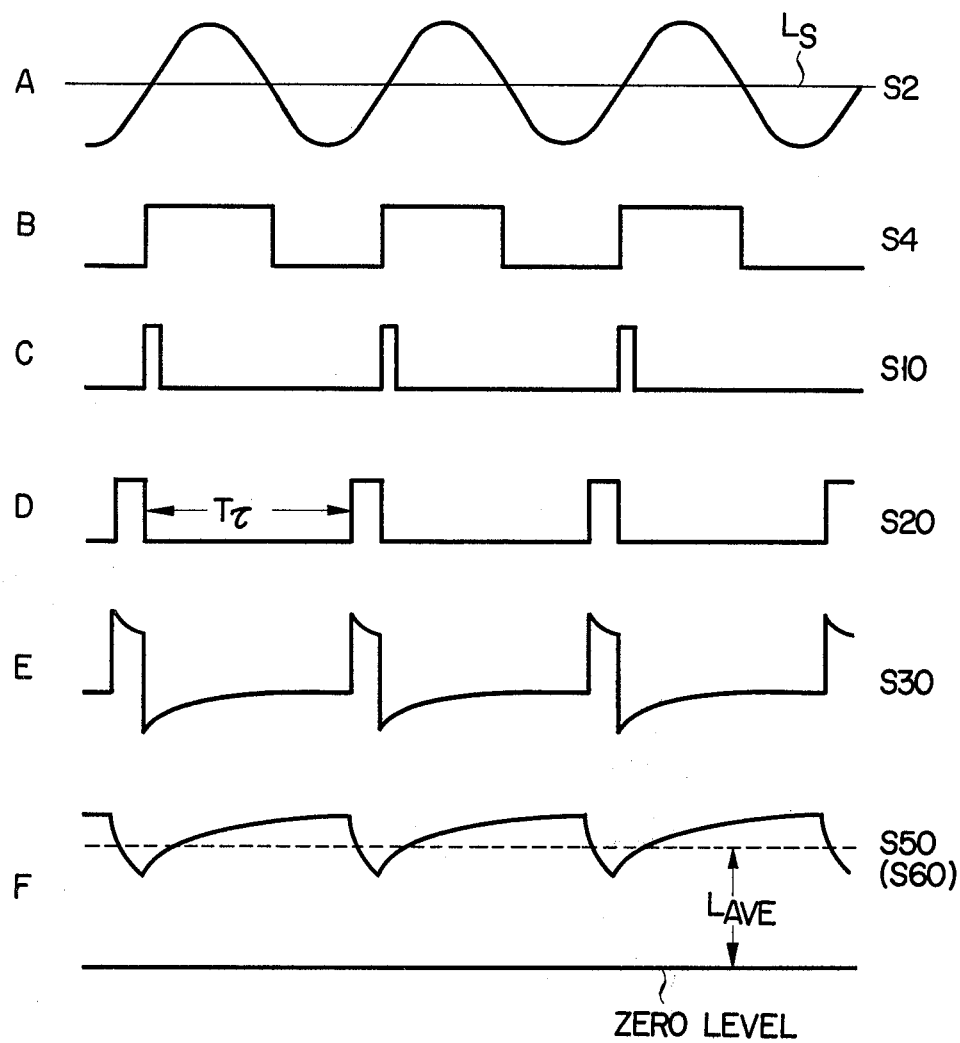
FIG. 4 is a timing chart illustrating the operation of the embodiment of FIG. 3.

FIG. 3 is a block diagram showing an embodiment of the invention, and FIG. 4 is a timing chart illustrating the operation of the embodiment. Referring to FIG. 3, a frequency generator 2 is connected to a DC servomotor (FG motor) 70. The frequency generator 2 produces a signal S2, as shown in A of FIG. 4, having a frequency corresponding to the rotational speed of the motor 70. The signal S2 is inputted to a wave shaper 4. The wave shaper 4 may be formed of an amplifier performing a clipping operation (for instance a Zero-cross sensor) or a Schmitt circuit. The wave shaper 4 produces a signal S4 whose level is inverted at every time when the signal S2 crosses a predetermined level LS (e.g. ground level). The signal S4 is illustrated in B of FIG. 4. The signal S4 is coupled to a trigger pulse generator 6 for converting the signal S4 into a trigger pulse S10 as shown in C of FIG. 4. The trigger pulse generator 6 is a sort of differentiation circuit which differentiates the rising edge of the signal S4. The detailed circuitry of generator 6 is not described here, but a circuitry of this sort is shown in, e.g. FIG. 5 of Japanese Utility Model Application No. 156832/79 filed by the same applicant. The components 2, 4 and 6 mentioned above constitute first means 10 for producing a first signal as pulse signal, i.e., the trigger pulse S10, having a period corresponding to the rotational speed of the motor.

The trigger pulse S10 is inputted to a timer circuit 20. The timer circuit 20 constitutes second means for producing a second signal S20, as shown in D of FIG. 4. The signal S20 is held at a logic level "0" (first level) for a predetermined period Tτ after the circuit 20 is triggered by the pulse S10 and subsequently the signal S20 is held at a logic level "1" (second level) until the circuit 20 is retriggered by the pulse S10. The timer circuit 20 may be constructed with a conventional one-shot circuit (for instance a monostable multivibrator). Alternatively, the circuit 20 may be a modulo N counter for counting a clock pulse signal having a predetermined period. In this case, the circuit 20 starts to count the clock pulse signal (not shown) when it is triggered by the trigger pulse S10. When the circuit 20 completes the counting of N clock pulses, it produces the second signal S20 as a carry signal and ends the counting, so that it supplies the logic level "1" signal until it is retriggered by the pulse S10. With such a modulo N counter, the period required for the circuit 20 to count N pulses corresponds to the said predetermined period Tτ.

The second signal S20 is inputted to a phase compensator 30. The phase compensator 30 effects phase compensation for phase advance, and it is a sort of a differentiation circuit. It produces a third signal S30, as shown in E of FIG. 4, having a waveform representing the level change rate or the duty cycle of the second signal S20. In other words, the compensator 30 constitutes third means for producing a third signal S30 which is obtained through phase compensation of phase advance for the second signal S20.

The third signal S30 is inputted to a voltage/current converter 40. The voltage/current converter 40 constitutes fourth means for supplying a first current signal I10 and receiving a second current signal I20 in accordance with the level of the third signal S30. More particularly, the converter 40 supplies the first current signal I10 when the potential of the third signal S30 is below a level $L_{TH}$ to be described later and receives the second current signal I20 when the potential is above the level $L_{TH}$. The converter 40 may be constructed by a complementary inverter or the like.

The transfer of the first and second current signals I10 and I20 is effected between the voltage/current converter 40 and an integrator 50. The integrator 50 uses as the integrating element a capacitor having a capacitance of the order of $\mu F$. The capacitor is charged by the first current signal I10 and discharged by the second current signal I20. The charged voltage of the capacitor is provided as an output signal S50 which corresponds to the time integral values of the first and second current signals I10 and I20. Thus, the integrator 50 constitutes fifth means for providing an output signal S50 obtained through the integration of the first and second current signals I10 and I20.

The output signal S50 is inputted to a buffer circuit 60. The buffer circuit 60 effects the impedance conversion and/or power amplification of the output signal S50 to produce a drive signal S60. The signal S60 is supplied to the motor 70. The motor 70 is thus rotated at a rotational speed substantially proportional to the drive signal S60, which is inversely proportional to the average level $L_{AVE}$ of the output signal S60 shown in F of FIG. 4. The signals S50 and S60 have waveforms containing ripples as shown in F of FIG. 4. However, the ripple component is absorbed by the rotational kinetic energy of the motor 70, so that it practically has no adverse effects. The buffer circuit 60 constitutes sixth means for driving the motor 70 in accordance with the level of the output signal S50.

The servo operation of the construction shown in FIG. 3 is basically the same as in the prior art. When the rotational speed of the motor 70 is reduced, the frequency of the signal S2 (A of FIG. 4) is reduced, thus increasing the pulse interval of the pulse S10 (C of FIG. 4) to increase the high level period of the signal S20 (D of FIG. 4). As a result, the discharge period in the integrator 50, or the period of flow of the current I20, is increased to reduce the average level $L_{AVE}$ (F of FIG. 4). With the reduction of the level $L_{AVE}$ the drive signal S60 is increased in level to compensate for the reduction of the rotational speed of the motor 70. In this way, the motor 70 is automatically controlled to a constant rotational speed.

Figure 5:
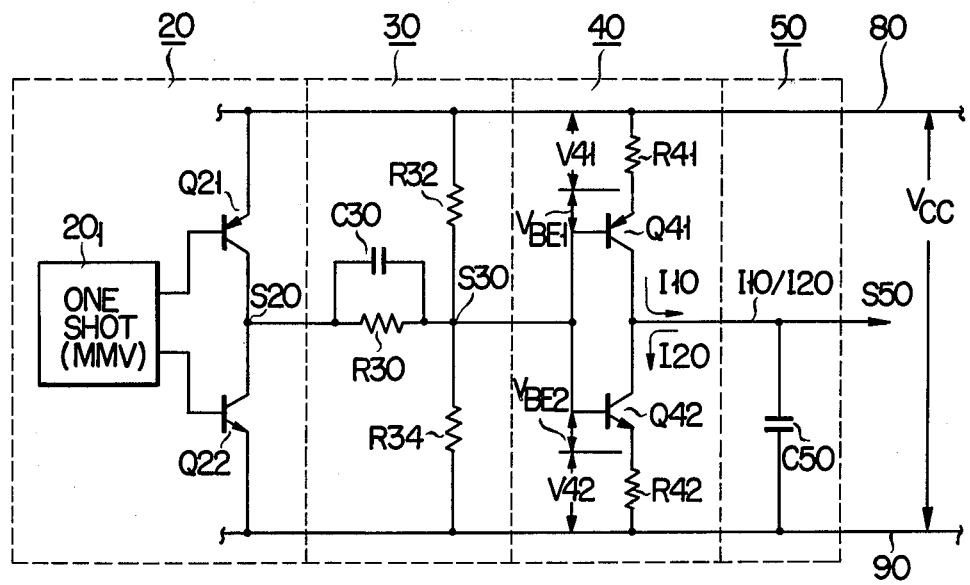
FIG. 5 is a circuit diagram showing the detailed circuit construction of elements in the embodiment of FIG. 3.

FIG. 5 shows the detailed circuit construction of the components 20, 30, 40 and 50 shown in the circuitry of FIG. 3. In FIG. 5, the output of a one-shot circuit $20_1$ is coupled to the base of a PNP transistor Q21 and also to the base of an NPN transistor Q22. The emitter of transistor Q21 is connected to a power supply circuit 80, and the emitter of transistor Q22 is connected to a circuit ground 90. The DC potential at the circuit 80 is the power supply voltage Vcc, and the potential at the circuit ground 90 is zero level. The AC potentials of the power supply circuit 80 and the circuit ground 90 are both zero level. Namely, each of the circuit 80 and 90 may be considered as a fixed reference potential circuit for signal frequencies. The aforementioned second signal S20 is produced from the juncture between the transistors Q21 and Q22.

The collectors of the transistors Q21 and Q22 are connected through a parallel circuit consisting of a capacitor C30 and a resistor R30 to one end of each of resistors R32 and R34. The other end of the resistor R32 is connected to the power supply circuit 80, and the other end of the resistor R34 is connected to the circuit ground 90. The aforementioned third signal S30 is obtained from the juncture between the resistors R32 and R34. The resistors R30 serves as a first compensation resistor provided between the first and second signals S20 and S30. The parallel resistance of the resistors R32 and R34 constitutes a second compensation resistance R33, that is, $$R33 = R32 // R34 \qquad (6)$$

This resistance R33 is provided between the end of the resistor R30 on the side of the third signal S30 and the circuit 80 (or circuit ground 90) with zero AC potential level.

The juncture between the resistors R32 and R34 is connected to the base of a PNP transistor Q41 and also to the base of an NPN transistor Q42. The emitter of the transistor Q41 is connected through a resistor R41 to the power supply circuit 80, and the emitter of the transistor Q42 is connected through a second resistor R42 to the circuit ground 90. The collectors of the transistors Q41 and Q42 are commonly connected through an integration capacitor C50 to the circuit ground 90. The aforementioned first current signal I10 is supplied from the collector of the transistor Q41 to the capacitor C50, and the second current signal I20 is transferred from the capacitor C50 to the collector of the transistor Q42. The output signal S50 is produced from the juncture between the collectors of the transistors Q41, Q42 and the capacitor C50.

When the one-shot circuit $20_1$ is triggered by the pulse S10, the transistor Q22 is turned on while the transistor Q21 is turned off. The transistors Q21 and Q22 constitute a complimentary push-pull circuit; these transistors are provided for on-off separation, and their on-resistance are considerably low. Although the collector output impedance of a transistor in the non-saturated operation is very high, in case where one of two transistors is always in the saturated state as the transistors Q21 and Q22, the collector output impedance of the complementary circuit is low. For the transistors Q41 and Q42 the emitter resistors R41 and R42 are provided, so that the base input impedances of these transistors Q41 and Q42 may be made to be sufficiently high when the current amplification factors thereof are high. For the above reason, by appropriately selecting the CR in the phase compensator circuit 30, it is possible practically to ignore the impedances connected to the input and output terminals of the circuit 30; that is, it is possible in practice to regard the collector output impedances of the transistors Q21 and Q22 to be zero and the base input impedances of the transistors Q41 and Q42 to be infinity. The transfer function in case where these impedances are ignored will be described hereinafter. The operation of the circuit shown in FIG. 5 will now be described.

Figure 6:
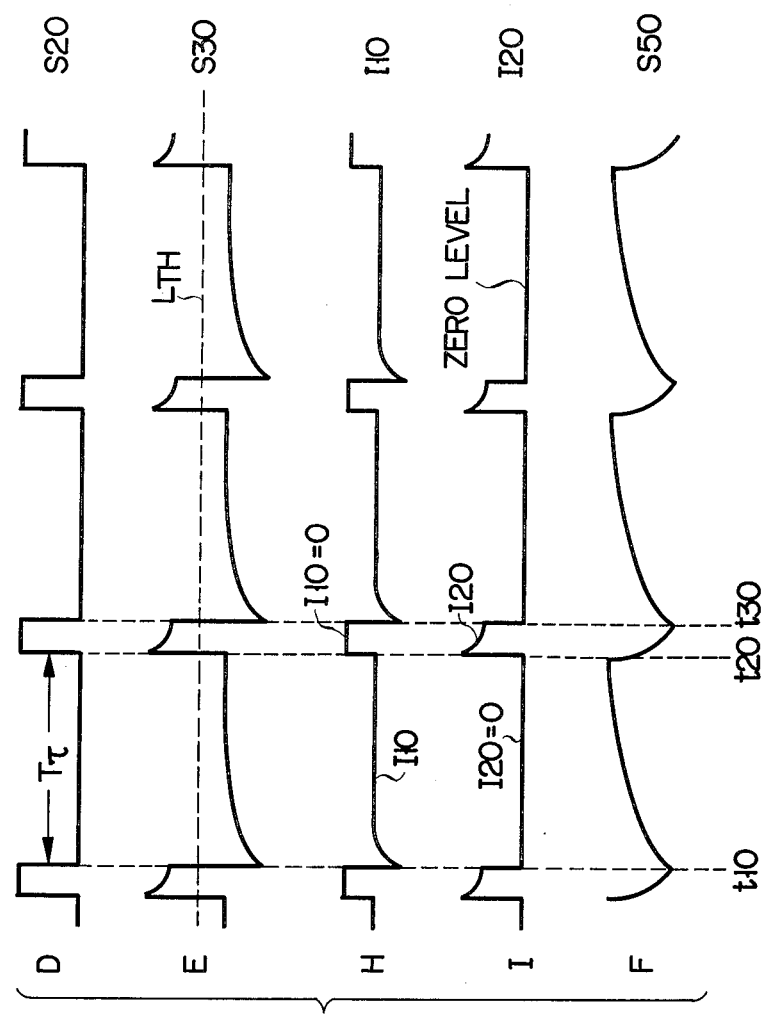
FIG. 6 is a timing chart illustrating the operation of the circuit of FIG. 5.

FIG. 6 is a timing chart illustrating the operation of the circuit of FIG. 5. When the transistor Q22 is turned on with the triggering of the one-shot circuit $20_1$ caused at an instant t10, the signal S20 is inverted to the low level (i.e., practically zero level) as shown in D of FIG. 6. This falling of the signal S20 is differentiated through the phase compensator 30 to produce differential signal S30 as shown in E of FIG. 6, which is supplied to the base of the transistor Q41. As soon as the signal S30 becomes lower than the predetermined threshold level $L_{TH}$ at the instant t10, the transistor Q41 is turned on. The condition satisfying the transistor Q41 to be turned on is given as $$S30 \leq L_{TH} = V_{cc} - V_{BE1} - V41 \tag{7}$$

where $V_{BE1}$ is the base-emitter threshold voltage of the transistor Q41, and V41 is the voltage drop across the resistor R41. Immediately before the transistor Q41 is turned on, V41=0 since I10=0. Thus, assuming $V_{BE1}=0.6$ V, immediately after the turning-on of the transistor Q41 (i.e., immediately after the instant t10) inequality (7) can be simplified to $$S30 \leq V_{cc} - 0.6 \tag{8}$$

The unit of the individual terms in inequality (8) is in volts.

Meanwhile, the transistor Q42 is turned off with the falling of the signal S30 at the instant t10, at which time $$S30 < V_{BE2} + V42 \tag{9}$$

where $V_{BE2}$ is the base-emitter threshold voltage of the transistor Q42, and V42 is the voltage drop across the resistor R42. Immediately after the transistor Q42 is turned off, V42=0 since I20=0. Thus, assuming $V_{BE2}=0.6$ V, immediately after the turning-off of the transistor Q42 (i.e., immediately after the instant t10), inequality (9) can be simplified to $$S30 < 0.6 \tag{10}$$

The inequalities (7) and (9) are satisfied for the aforementioned predetermined period $T\tau$ from the instant t10 till an instant t20. During this period, the first current signal I10 of a predetermined level as shown in H of FIG. 6 is supplied to the capacitor C50, and the second current signal I20 remains zero. By the signal I10 the capacitor C50 is charged, and its charged voltage, i.e., the output signal S50, is increased in a manner as shown in F of FIG. 6; during the period from the instant t10 until the instant t20 the level of the output signal S50 is increased at the rate corresponding to the magnitude of the signal I10. Although the illustrated waveform of the signal S50 is non-linear, the signal S50 has a linear waveform when the voltage Vcc is sufficiently high, or when the transistor Q41 supplies practically a constant current. If the power supply voltage Vcc is practically the lower limit of the working voltage range and the resistance R41 is low, the output impedance of the transistor Q41 cannot always be thought to be sufficiently high. In such a case, perfect constant current supply cannot be made, and the signal S50 has a non-linear waveform. The non-linear waveform of the output signal S50 itself, however, has no adverse effects upon the servo-operation of the motor control apparatus.

After the lapse of the predetermined period $T\tau$, the one-shot circuit $20_1$ is brought back to its initial "off" or untriggered state. As a result, the transistor Q21 is turned on, and the transistor Q22 is turned off. In other words, at the instant t20 the signal S20 is inverted to the high level (i.e, practically Vcc level) as shown in D of FIG. 6. In response to the rising of signal S20 the phase compensator 30 produces the signal S30 as shown in E of FIG. 6, which is supplied to the bases of transistors Q41 and Q42. When the level of signal S30 satisfies a condition $$S30 \geq V_{BE2} + V42 \tag{11}$$

the transistor Q42 is turned on. Immediately after the instant t20 inequality (11) can be simplified to $$S30 \geq 0.6 \tag{12}$$

for the same reason as discussed above in connection with inequality (9). Also, when the level of the signal S30 satisfies a condition $$S30 > L_{TH} = V_{cc} - V_{BE1} - V41 \tag{13}$$

the transistor Q41 is turned off. Immediately after the instant t20 inequality (13) can be simplified to $$S30 > V_{cc} - 0.6 \tag{14}$$

for the same reason as discussed above in connection with inequality (7).

The inequalities (11) and (13) are satisfied for a period from the instant t20 until an instant t30 when the one-shot circuit $20_1$ is retriggered. During this period, the second signal I20 with the level as shown in I of FIG. 6 is supplied from the capacitor C50 to the collector of transistor Q42. During this time, the first current signal I10 is not produced. By producing the signal I20 the capacitor C50 is discharged, and its charged voltage is reduced in level as shown in F of FIG. 6; during the period from the instant t20 until an instant t30 the level of the output signal S50 is reduced at the rate corresponding to the magnitude of the signal I20. The operation after the instant t30 is the same as that after the instant t10.

The aforementioned threshold level $L_{TH}$ can be expressed as $$L_{TH} \approx \frac{R34}{R32 + R34} V_{cc} \tag{15}$$

if the input impedances of the transistors Q41 and Q42 are ignored. Also, where the current amplification factors $h_{FE}$ of the transistors Q41 and Q42 is sufficiently high, i.e., where the base currents therein are negligibly small compared to the collector currents, we have $$I10 \approx V41/R41 \tag{16}$$

and $$I20 \approx V42/R42 \tag{17}$$

Equations (16) and (17) indicate that the charging and discharging currents I10 and I20 can be freely set depending upon the resistances R41 and R42.

Figure 7:
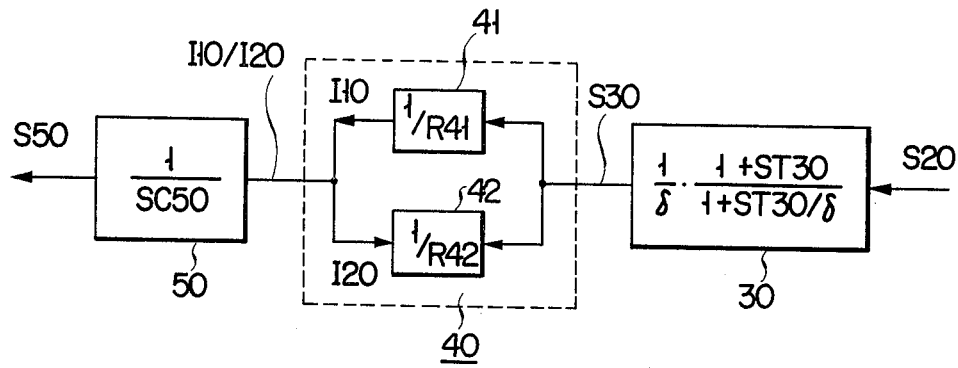
FIG. 7 is a block diagram showing the transfer function of the circuit of FIG. 5.

FIG. 7 shows a block diagram, in which the transfer functions of the components 30, 40 and 50 are indicated. In this figure, S represents a complex number parameter ($S = \sqrt[3]{} + j\omega$), and a factor $\delta$ and a time constant T30 are given as $$\delta = \frac{R33 + R30}{R33} = 1 + \frac{R30}{R33} \quad (18)$$

and $$T30 = C30 R30 \quad (19)$$

In equation (18), R33 represents the parallel resistance of the resistors R32 and R34 given by equation (6), but where the input impedance of the transistors Q41 and Q42 is not negligible, the parallel resistance of the input impedances of these transistors and the resistance R33 of equation (6) is used as R33 in equation (18).

As shown in the block 30 of FIG. 7, the transfer function F1(S) of the phase compensator 30 is given as $$F1(S) = \frac{1}{\delta} \cdot \frac{1 + ST30}{1 + ST30/\delta} \quad (20)$$

If the transfer function of the circuit from the component 2 through the component 20 is ignored as a constant (=1), equation (20) represents the transfer function of the circuit from the frequency generator 2 through the phase compensator 30. In the block 40, the transfer function F2(S) from the signal S30 to the signal I10 and the transfer function F3(S) from the signal S30 to the signal I20 are shown. They are $$F2(S) = \frac{1}{R41} \quad (21)$$

and $$F3(S) = \frac{1}{R42} \quad (22)$$

In the block 50, the transfer function F4(S) of the integrator 50 is shown. It is $$F4(S) = \frac{1}{SC50} \quad (23)$$

When equation (21) is used as the transfer function of the block 40, the transfer function H2(S) of the entire circuit of FIG. 7 is $$H2(S) = F1(S) F2(S) F4(S) = \quad (24)$$
$$\frac{1}{\delta} \cdot \frac{1}{C50 R41} \cdot \frac{1 + ST30}{S(1 + ST30/\delta)}$$

In equation (24), the constant factor independent of the complex number parameter, i.e., gain G2 is $$G2 = \frac{1}{\delta C50 R41} \quad (25)$$

Figure 8:
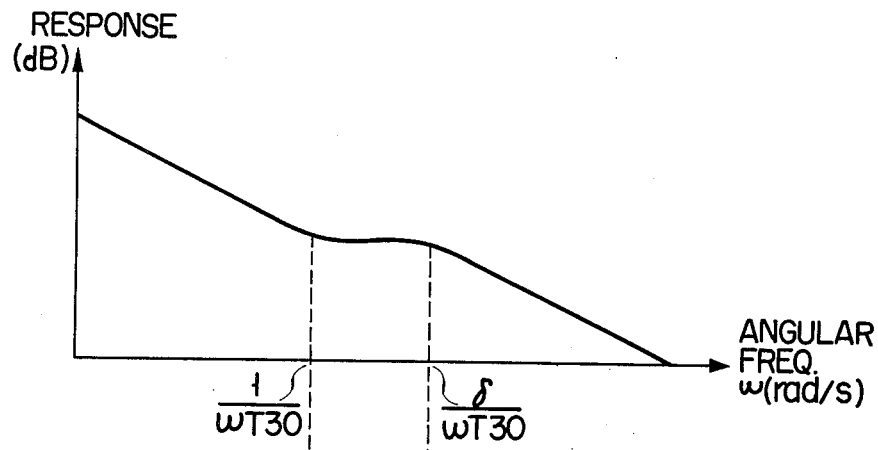
FIGS. 8 and 9 are graphs showing characteristics of the circuit shown in FIG. 7 (or 3).
Figure 9:
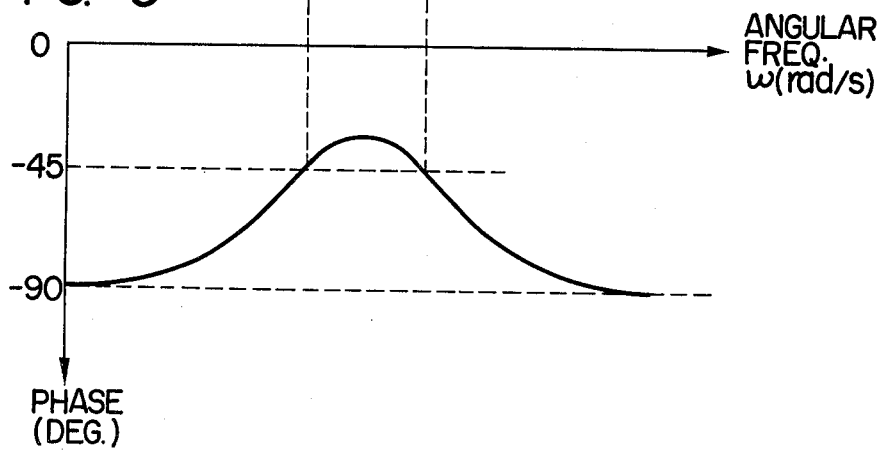
Figure 10:
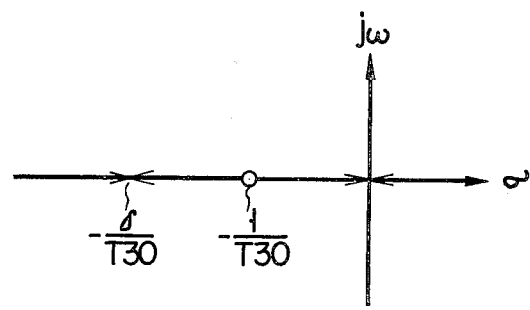
FIG. 10 shows an "S" plane indicating pole point and zero point corresponding to the characteristic of FIG. 9.

FIG. 8 shows a frequency response characteristic in case where $S = j\omega$ in the transfer function H2(S) given by equation (24), and FIG. 9 shows a phase characteristic in the same case. FIG. 10 shows the pole point and zero point in the S plane (i.e., $\sigma - j\omega$ plane) of the transfer function H2(S) shown in FIGS. 8 and 9. As seen from FIGS. 8 through 10, the factor $\sigma$ is an important factor concerning the maximum phase shift (phase advance) and advanced phase shift range in the phase compensation.

It is to be appreciated from equations (2) and (18) mentioned above, that in the prior art circuit shown in FIG. 1 the factor $\delta_1$ depends upon the ratio between the capacitances C4 and C3, whereas in the motor control apparatus shown in FIGS. 3 and 7 according to the invention the factor $\delta$ depends upon the ratio of the resistances R30 and R33 (R33=R32//R34). This difference is very important in the mass production of the motor control apparatus.

(1) Highly precise capacitors, which have capacitances of the order of $\mu F$, are large in size and expensive. If aluminum chemical capacitors which are small in size and cheap are used for the capacitances C3 and C4 in equation (2), it will lead to extreme fluctuations of the factor $\delta_1$. This is because the capacitance fluctuations of aluminum chemical capacitors usually range from $-10\%$ to $+50\%$. If highly precise film capacitors are used for the capacitances C3 and C4, the motor control apparatus is large in size, and also its cost is high. Use of small-size tantalum capacitors for the capacitances C3 and C4 is hardly a basic solution to these problems. Small-size tantalum capacitors are expensive and require more spaces for installation than resistors. Besides, their capacitance variation range is comparatively wide. Further, a variety of standardized values of capacitances for commercially available capacitors are less in number than those of resistors, and this means that the freedom of selecting capacitors is less compared to the case of resistors.

(2) Compared to capacitors, resistors are inexpensively available as those having small sizes and high precision ratings. In addition, unlike the high capacitance capacitors the resistors are capable of ready integration into IC. Usually, the absolute values of resistances of resistors in the IC manufactured on the mass production vary up to about $\pm 20\%$, but it is possible to hold fluctuations of resistance ratios, for instance R30/R33 in equation (18), within $\pm 2-3\%$. For this reason, where the resistors R30 to R34 in the circuit of FIG. 5 are diffusion resistors formed in the same IC chip, the fluctuations of the factor $\delta$ given by equation (18) are very slight.

Now, considering the limit of H2(S) in equation (24) when S approaches 0, i.e., the transfer function H2(O) in the DC region, it diverges to infinity. This result is caused by the fact that the input resistance of the buffer circuit 60 is thought to be infinite. Actually, however, the circuit 60 has a finite resistance, so that H2(O) is not infinite. However, since H2(S) contains the integral element 1/S, its value in the DC or in a frequency region close to DC is very high. Consequently, changes of the rotational sopeed of the motor 70 with changes of the load can be held within a sufficiently small range.

It is also to be appreciated from equations (5) and (25) that the gain G1 in equation (5) depends not only upon the integration capacitor but also upon the phase compensation capacitor C4, whereas the gain G2 in equation (25) depends upon the integration capacitor C50 only. In the case of the prior-art circuit, the open loop gain G in the servo-system is affected by the mutual influences of the phase compensator and integrator circuit due to the presence of the capacitor C4. In contrast, according to the invention the phase compensator and integrator are practically independent of one another. This is because according to the invention the factor $\delta$ commonly present in equations (20) and (25) can be made substantially constant as mentioned earlier (cf. eg. 18). This means that when the circuit consisting of the components 4 through 40 and 60 are fabricated into IC, the phase compensation in the servo-system can readily be completed, and that its characteristics are subject to less fluctuations.

The circuit construction shown in FIG. 5 further has a very important feature. In this circuit, there is a voltage relation $$Vcc = V41 = V_{BE1} + V_{BE2} + V42 \qquad (26)$$

It is assumed that at room temperature $V_{BE1} = V_{BE2} = 0.6$ V and that V41 and V42 is 0.1 V. Since the transistors Q41 and Q42 effect switching operations in opposite phase relation to each other, it may be thought that when one of the voltages V41 and V42 is 0.1 V the other is 0 V. Also, the voltage $V_{BE}$ on one of the transistors Q41 and Q42 which is "off" is less than 0.6 V. In the above assumption, the lower limit of the voltage Vcc supplied to the voltage/current converter is well below 1.4 V. This means that if the components 4, 6, 20 and 60 of the circuitry shown in FIG. 3 are designed such that they are operable with a low voltage below 1.4 V, the motor control apparatus according to the invention can be operated with a single 1.5 V battery. The prior-art circuit shown in FIG. 1 cannot be operated with a power supply voltage Vcc of 1.5 V.

Figure 11:
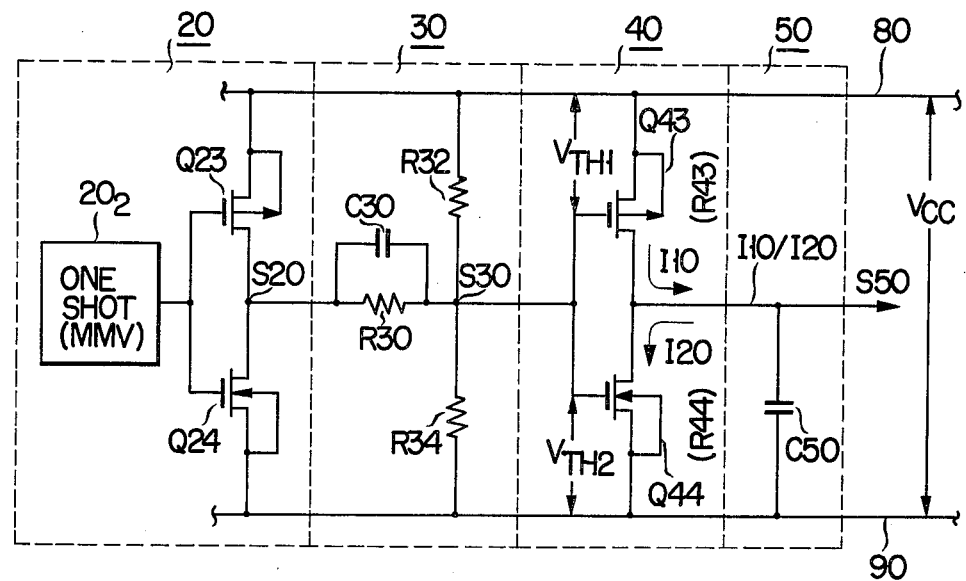
FIG. 11 is a circuit diagram showing a modification of the circuit of FIG. 5.

FIG. 11 shows a modification of the circuit shown in FIG. 5. In this circuit, a C-MOS inverter consisting of a P-channel MOS transistor Q23 and an N-channel MOS transistor Q24 is used as an output buffer for one-shot circuit $20_2$. Also, a C-MOS inverter consisting of a P-channel MOS transistor Q43 and an N-channel MOS transistor Q44 is used as the voltage/current converter 40. From FIGS. 5 and 11 the following correlations can be readily obtained.

$$\left. \begin{array}{l} V_{BE1} + V41 \Longleftrightarrow V_{TH1} \\ V_{BE2} + V42 \Longleftrightarrow V_{TH2} \end{array} \right\} \qquad (27)$$

where $V_{TH1}$ and $V_{TH2}$ are respectively the gate threshold voltages of the transistors Q43 and Q44. Also, denoting the resistances of the transistors Q43 and Q44 in the "on" state by R43 and R44, the following correlations can be readily understood.

$$\left. \begin{array}{l} R41 \Longleftrightarrow R43 \\ R42 \Longleftrightarrow R44 \end{array} \right\} \qquad (28)$$

In FIG. 11, suppose that Vcc, $V_{TH1}$ and $V_{TH2}$ are set to satisfy a condition $$V_{TH1} + V_{TH2} > Vcc \qquad (29)$$

For example, inequality (29) is satisfied by setting $V_{TH1} = V_{TH2} = 0.9$ V and $1.7 \text{ V} \geq Vcc \geq 1.3$ V.

Figure 12:
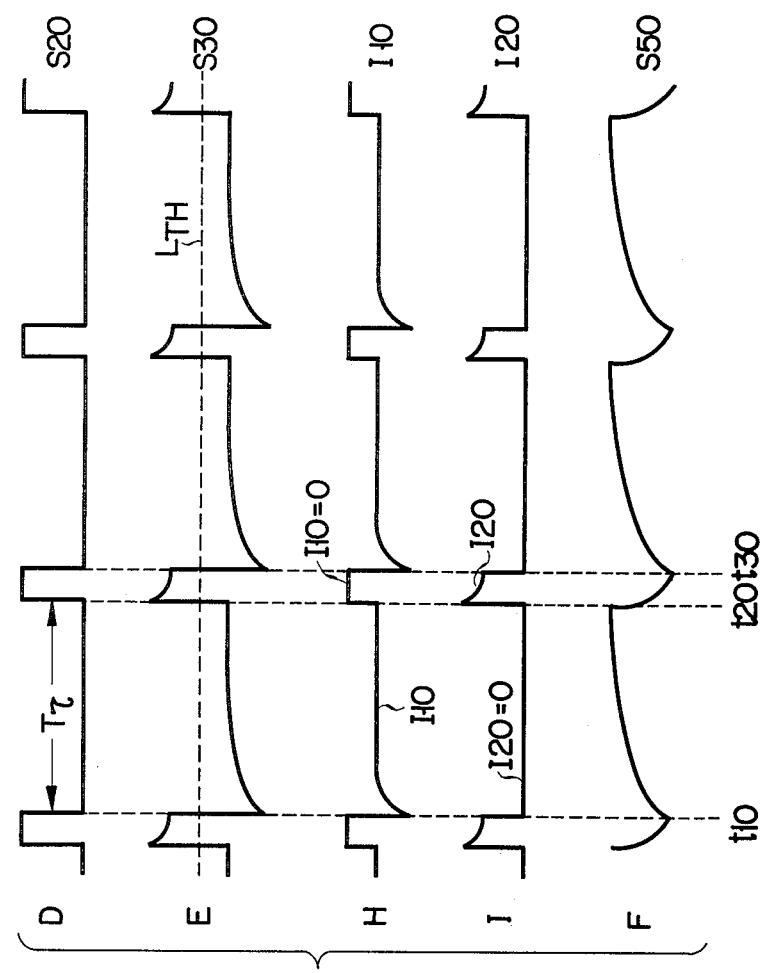
FIG. 12 is a timing chart showing the operation of the circuit of FIG. 11.

In operation, when a condition $$\left. \begin{array}{l} S30 \leq Vcc - V_{TH1} \\ S30 < V_{TH2} \end{array} \right\} \qquad (30)$$

is satisfied at an instant t10 shown in FIG. 12, the transistor Q43 is turned on, while the transistor Q44 is turned off. The condition (30) corresponds to the case where $S30 < L_{TH}$ in E of FIG. 12. At this time, I20=0, and the signal I10 is supplied to the capacitor C50. When a condition $$\left. \begin{array}{l} S30 > Vcc - V_{TH1} \\ S30 \geq V_{TH2} \end{array} \right\} \qquad (31)$$

is satisfied at a subsequent instant t20, the transistor Q43 is turned off, while the transistor Q44 is turned on. The condition (31) corresponds to the case where $S30 > L_{TH}$ in E of FIG. 12. At this time, I10=0, and the signal I20 is caused to flow from the capacitor C50.

When the C-MOS inverter as shown in FIG. 11 is adopted, it is possible to establish operation with a still lower voltage than the case of using the complementary inverter consisting of bipolar transistors as shown in FIG. 5. This is because $V_{TH1}$ and $V_{TH2}$ can be made lower than $V_{BE}$ through the gate control at the time of the fabrication of the MOS IC. In addition, since the input impedance of the C-MOS inverter is extremely high, very high resistances can be set for the resistors R30-R34. This means that the capacitance of the capacitor C30 may be reduced, and thus it is possible to use for the capacitance C30 a comparatively inexpensive, small-size and highly precise film capacitor or temperature compensation type ceramic capacitor.

The embodiments described above and illustrated in the drawings are by no means limitative, and various changes, additions and substitutions of well-known means are possible without departing from the scope of the invention as defined in claims thereof.

What we claim is:

1. A motor control apparatus comprising:
   (a) first means for producing a first signal having a period corresponding to the rotational speed of a motor;
   (b) second means for producing a second signal inverted to a first level in response to said first signal and subsequently inverted to a second level after the lapse of a predetermined period of time;
   (c) third means for producing a third signal obtained through a phase advance type phase compensation for said second signal, said third means including a first compensation resistor provided between a point to which said second signal is applied and a point from which said third signal is derived, a capacitor connected in parallel with said first compensation resistor, and a second compensation resistor provided between said third signal supply end of said first compensation resistor and a fixed reference potential circuit for signal frequencies;
   (d) fourth means for supplying and receiving a first current signal and a second current signal in accordance with the level of said third signal;
   (e) fifth means for producing an output signal obtained through the integration of said first and second current signals; and
   (f) sixth means for driving said motor in accordance with the level of said output signal.

2. A motor control apparatus comprising:
   (a) first means for producing a first signal having a period corresponding to the rotational speed of a motor;
   (b) second means for producing a second signal inverted to a first level in response to said first signal and subsequently inverted to a second level after the lapse of a predetermined period of time;

(c) third means for producing a third signal obtained through a phase advance type phase compensation for said second signal;

(d) fourth means for supplying and receiving a first current signal and a second current signal in accordance with the level of said third signal, said fourth means including an emitter grounded type complimentary inverter having transistors of first and second conductivity types, a first resistor connected in series with the emitter of said first conductivity type transistor, and a second resistor connected in series with the emitter of said second conductivity type transistor;

(e) fifth means for producing an output signal obtained through the integration of said first and second current signals; and (f) sixth means for driving said motor in accordance with the level of said output signal.

3. A motor control apparatus comprising:

(a) first means for producing a first signal having a period corresponding to the rotational speed of a motor;

(b) second means for producing a second signal inverted to a first level in response to said first signal and subsequently inverted to a second level after the lapse of a predetermined period of time;

(c) third means for producing a third signal obtained through a phase advance type phase compensation for said second signal;

(d) fourth means for supplying and receiving a first current signal and a second current signal in accordance with the level of said third signal, said fourth means including a complementary inverter having MOS transistors of first and second conductivity types;

(e) fifth means for producing an output signal obtained through the integration of said first and second current signals; and (f) sixth means for driving said motor in accordance with the level of said output signal.

4. A motor control apparatus comprising:

(a) first means for producing a first signal having a period corresponding to the rotational speed of a motor;

(b) second means for producing a second signal inverted to a first level in response to said first signal and subsequently inverted to a second level after the lapse of a predetermined period of time;

(c) third means for producing a third signal obtained through a phase advance type phase compensation for said second signal, said third means including a first compensation resistor provided between a point to which said second signal is applied and a point from which said third signal is derived, a capacitor connected in parallel with said first compensation resistor, and a second compensation resistor provided between said third signal supply end of said first compensation resistor and a fixed reference potential circuit for signal frequencies;

(d) fourth means for supplying and receiving a first current signal and a second current signal in accordance with the level of said third signal, said fourth means including an emitter grounded type complimentary inverter having transistors of first and second conductivity types, a first resistor connected in series with the emitter of said first conductivity type transistor, and a second resistor connected in series with the emitter of said second conductivity type transistor;

(e) fifth means for producing an output signal obtained through the integration of said first and second current signals; and (f) sixth means for driving said motor in accordance with the level of said output signal.

5. A motor control apparatus comprising:

(a) first means for producing a first signal having a period corresponding to the rotational speed of a motor;

(b) second means for producing a second signal inverted to a first level in response to said first signal and subsequently inverted to a second level after the lapse of a predetermined period of time;

(c) third means for producing a third signal obtained through a phase advance type phase compensation of said second signal;

(d) fourth means for supplying and receiving a first current signal and a second current signal in accordance with the level of said third signal, said fourth means including a complimentary inverter having MOS transistors of first and second conductivity types;

(e) fifth means for producing an output signal obtained through the integration of said first and second current signals; and (f) sixth means for driving said motor in accordance with the level of said output signal.

6. A motor control apparatus according to claim 1, 4 or 5, wherein the transfer function G of said third means substantially expressed as $$G = \frac{1}{\delta} \cdot \frac{1 + ST30}{1 + ST30/\delta}$$

where $\delta$ represents a value obtained by adding 1 to the quotient of division of the resistance of said first compensation resistor by the resistance of said second compensation resistor, S represents a complex number parameter, and T30 represents a time constant defined as the product of the capacitance of said capacitor and the resistance of said first compensation resistor.

7. A motor control apparatus according to any one of claims 1 to 5, wherein said third means is formed in a single semiconductor pellet.

8. A motor control apparatus according to claim 6, wherein said third means is formed in a single semiconductor pellet.

* * * * *